US012333985B2

(12) United States Patent

Bi

(10) Patent No.: US 12,333,985 B2

(45) Date of Patent: Jun. 17, 2025

(54) COMPENSATION METHOD FOR A PIXEL CIRCUIT AND DISPLAY PANEL

(71) Applicant: Shenzhen China Star Optoelectronics Semiconductor Display Technology Co., Ltd., Guangdong (CN)

(72) Inventor: Tao Bi, Guangdong (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/401,527

(22) Filed: Dec. 31, 2023

(65) Prior Publication Data

US 2024/0386827 A1 Nov. 21, 2024

(30) Foreign Application Priority Data

May 15, 2023 (CN) ........................ 202310545136.X

(51) Int. Cl.

*G09G 3/20* (2006.01)
*G09G 3/12* (2006.01)
*G09G 3/32* (2016.01)

(52) U.S. Cl.

CPC ............. *G09G 3/2007* (2013.01); *G09G 3/32* (2013.01); *G09G 2300/0842* (2013.01); *G09G 2310/0251* (2013.01); *G09G 2310/0262* (2013.01); *G09G 2320/0233* (2013.01)

(58) Field of Classification Search

CPC ................... G09G 3/2007; G09G 3/32; G09G 2300/0842; G09G 2310/0251; G09G 2310/0262; G09G 2320/0233

See application file for complete search history.

(56) References Cited

U.S. PATENT DOCUMENTS

| | | | | |
|---|---|---|---|---|
| 2019/0066555 A1* | 2/2019 | Gu | .......................... | G09G 3/006 |
| 2023/0178033 A1* | 6/2023 | Kim | ..................... | G09G 3/3291 345/204 |

* cited by examiner

*Primary Examiner* — Afroza Chowdhury

(74) *Attorney, Agent, or Firm* — PV IP PC; Wei Te Chung

(57) ABSTRACT

This application discloses a compensation method for a pixel circuit and a display panel. The compensation method firstly obtains the nonlinear function of the pixel circuit, then converts the nonlinear function into a corresponding linear function, and then obtains the compensated first gate-source voltage difference according to the linear function and the second gate-source voltage difference. Since the nonlinear function requires more compensation data and has a larger error than the linear function, using the converted linear function for compensation can reduce the required storage resources and improve the accuracy of compensation.

17 Claims, 4 Drawing Sheets

COMPENSATION METHOD FOR A PIXEL CIRCUIT AND DISPLAY PANEL

CROSS REFERENCE TO RELATED APPLICATION

This application claims the priority of Chinese Patent Application No. 202310545136.X, filed on May 15, 2023, the disclosure of which is incorporated herein by reference in its entirety.

FIELD OF THE DISCLOSURE

The present application relates to the field of display technology, and specifically relates to a compensation method for a pixel circuit, and a display panel.

BACKGROUND

External compensation pixel circuits usually need to compensate the data signal to obtain the desired display brightness. However, the existing compensation process needs to be implemented based on more compensation data, which in turn requires more storage resources.

SUMMARY

This application provides a compensation method for a pixel circuit and a display panel to alleviate the technical problem that storage resources are excessively occupied due to large amounts of compensation data.

In a first aspect, a compensation method for a pixel circuit is disclosed, compensation method comprises steps of: obtaining a nonlinear function of the pixel circuit, wherein the nonlinear function is a relationship curve between a voltage transmission loss ratio and a voltage of a data signal, the voltage transmission loss ratio is a ratio of a second gate-source voltage difference of a driving transistor in the pixel circuit in a light-emitting phase to a first gate-source voltage difference of the driving transistor in a writing phase; converting the nonlinear function into a corresponding linear function which is a relationship curve between the first gate-source voltage difference and the second gate-source voltage difference; obtaining a compensated first gate-source voltage difference according to the linear function and the second gate-source voltage difference.

In some embodiments, the step of converting the nonlinear function into the corresponding linear function which is the relationship curve between the first gate-source voltage difference and the second gate-source voltage difference comprises steps of: setting the voltage transmission loss ratio, the first gate-source voltage difference and the second gate-source voltage difference as Efficiency, Vgs@write and Vgs@emission, respectively; converting the nonlinear function into a following intermediate relationship:

$$\text{Efficiency}*Vgs@\text{write}=Vgs@\text{emission}.$$

In some embodiments, the step of converting the nonlinear function into the corresponding linear function which is the relationship curve between the first gate-source voltage difference and the second gate-source voltage difference further comprises steps of: converting the intermediate relationship into the linear function as follows:

$$Vgs@\text{emission}=k*Vgs@\text{write}+b,$$ where $k$ and $b$ are constants.

In some embodiments, the step of obtaining the compensated first gate-source voltage difference according to the linear function and the second gate-source voltage difference comprises steps of: storing k, b; obtaining the compensated first gate-source voltage difference according to k, b, the redetermined second gate-source voltage difference and the linear function.

In some embodiments, the step of converting the nonlinear function into the corresponding linear function which is the relationship curve between the first gate-source voltage difference and the second gate-source voltage difference comprises steps of: dividing the data signal into multiple grayscale ranges according to a voltage magnitude of the data signal; converting the nonlinear function into the multiple linear functions in different grayscale ranges.

In some embodiments, the step of converting the nonlinear function into a corresponding linear function which is the relationship curve between the first gate-source voltage difference and the second gate-source voltage difference further comprises steps of: constructing the multiple grayscale ranges including a low grayscale range and a high grayscale range; converting the nonlinear function into a first linear function in the low grayscale range and a second linear function in the high grayscale range.

In some embodiments, the step of converting the nonlinear function into the corresponding linear function which is the relationship curve between the first gate-source voltage difference and the second gate-source voltage difference further comprises steps of: determining the first linear function as Vgs@emission=k1*Vgs@write+b1, where k1 and b1 are constants; determining the second linear function as Vgs@emission=k2*Vgs@write+b2, where k2 and b2 are all constants.

In some embodiments, the step of obtaining the compensated first gate-source voltage difference according to the linear function and the second gate-source voltage difference comprises steps of: obtaining the compensated first gate-source voltage difference in the low grayscale range according to k1, b1, the redetermined second gate-source voltage difference and the linear function; obtaining the compensated first gate-source voltage difference in the high grayscale range according to k2, b2, the redetermined second gate-source voltage difference and the linear function;

In some embodiments, after the step of obtaining the compensated first gate-source voltage difference according to the linear function and the second gate-source voltage difference, the compensation method comprises steps of: determining the compensated data signal according to the compensated first gate-source voltage difference; charging the pixel circuit according to the voltage of the compensated data signal.

In a second aspect, the present application provides a display panel that performs the compensation method in at least one embodiment.

The pixel circuit compensation method and display panel provided by this application firstly obtain the nonlinear function of the pixel circuit, then convert the nonlinear function into the corresponding linear function, and then obtain the compensated first gate-source voltage difference according to the linear function and the second gate-source voltage difference. Since nonlinear functions require more compensation data and have larger errors than linear functions, using the converted linear function for compensation can reduce the required storage resources and improve the accuracy of compensation.

BRIEF DESCRIPTION OF THE DRAWINGS

In order to more clearly illustrate the technical solution in the embodiment of the present disclosure, the following will be a brief introduction to the drawings required in the description of the embodiment. Obviously, the drawings described below are only some embodiments of the present disclosure, for those skilled in the art, without the premise of creative labor, may also obtain other drawings according to these drawings.

DETAILED DESCRIPTION OF PREFERRED EMBODIMENTS

To help a person skilled in the art better understand the solutions of the present disclosure, the following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present disclosure.

In addition, the term "first", "second" are for illustrative purposes only and are not to be construed as indicating or imposing a relative importance or implicitly indicating the number of technical features indicated. Thus, a feature that limited by "first", "second" may expressly or implicitly include at least one of the features. In the description of the present disclosure, the meaning of "plural" is two or more, unless otherwise specifically defined.

Figure 1:
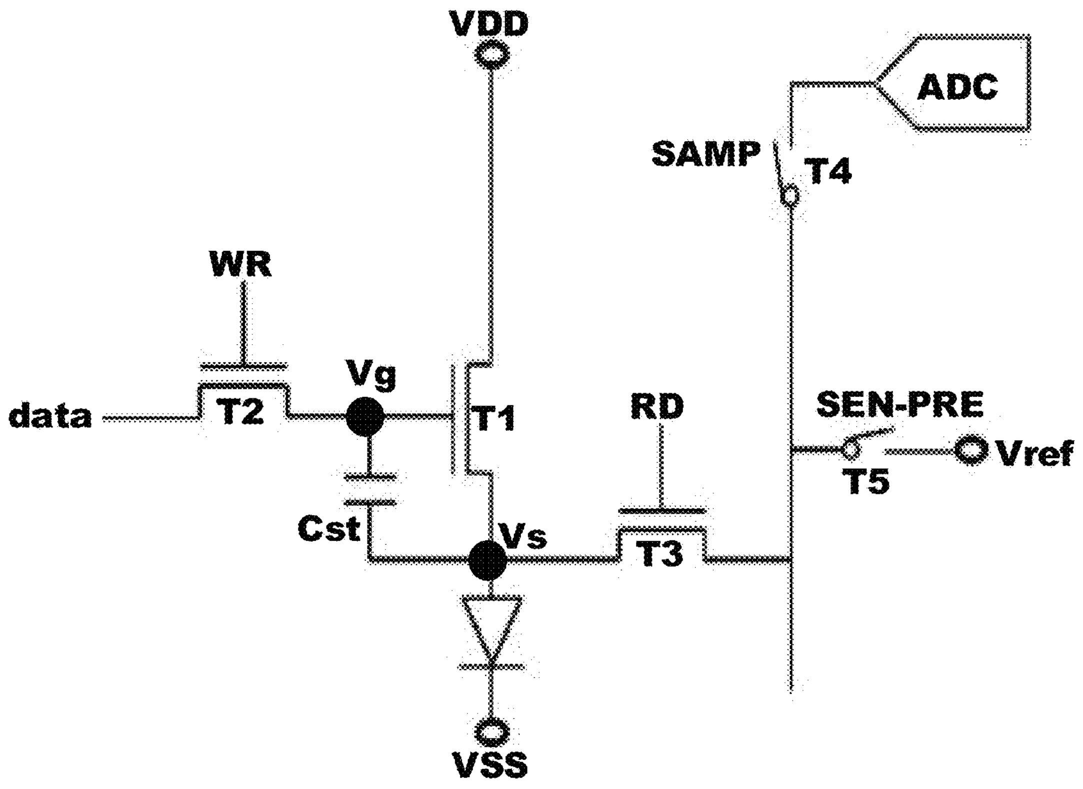
FIG. 1 (Prior art)
FIG. 1 is a schematic structural diagram of a pixel circuit in the related art.

FIG. 1 is a schematic structural diagram of a pixel circuit in the related art. As shown in FIG. 1, in the pixel circuit based on external compensation, a voltage Vg, Vs is firstly written to the gate and source of the driving transistor T1 respectively in the writing stage.

Figure 2:
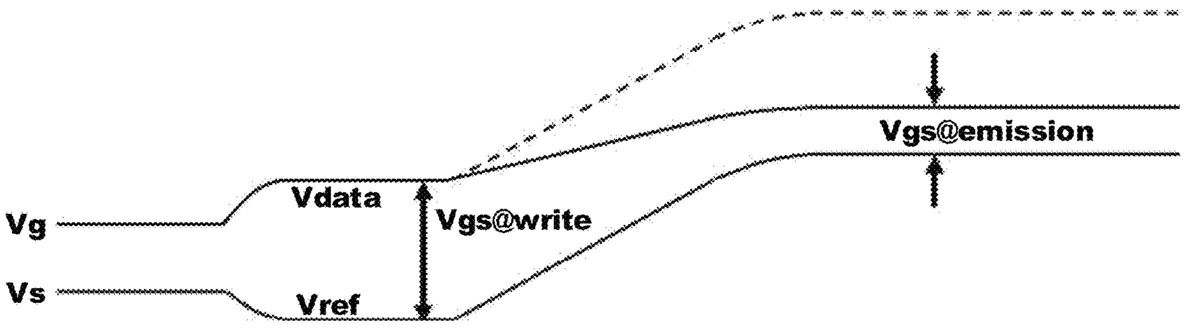
FIG. 2 (Prior art)
FIG. 2 is a schematic diagram comparing the gate-source voltage difference of the driving transistor in FIG. 1 during the writing stage and the light-emitting stage.

Then, the gate-source voltage difference (Vg−Vs) of the driving transistor T1 during the writing phase is Vgs@write (Vdata−Vref) as shown in FIG. 2. Then, due to the gate parasitic capacitance and source parasitic capacitance of the driving transistor T1 are not equal, and the gate potential and source potential of the driving transistor T1 rise at different rates. The gate-source voltage difference between voltage Vg and voltage Vs is jointly raised to Vgs@emission in the light-emitting stage shown in FIG. 2. Wherein, Vdata is the potential of the data signal (data). Vref is the potential of the reference signal (Vref).

Ideally, Vgs@write should be equal to Vgs@emission, but due to the unequal parasitic capacitances of the gate and source, the gate potential (Vg) of the driving transistor T1 is not raised as shown by the dotted line in FIG. 2. However, the gate potential (Vg) of the driving transistor T1 is raised like the solid line shown in FIG. 2, resulting in the rising rate of the gate potential of the driving transistor T1 being lower than the rising rate of the source potential (Vs) of the driving transistor T1, which in turn leads to a difference from the actual Vgs@emission to the ideal Vgs. This difference will cause the actual brightness of the light-emitting device to shift, resulting in poor display effects on the screen. For example, serious brightness unevenness (mura), poor external compensation effects, etc.

Wherein, in FIG. 1, the pixel circuit may also include a writing transistor T2. One of the source or drain of the writing transistor T2 is connected to the data line, and the other of the source or the drain of the writing transistor T2 is connected to the gate of the drive transistor T1. The gate of the write transistor T2 is connected to the scanning line.

Wherein, the data line is configured to transmit the data signal (data). The scan line is configured to transmit the scan signal (WR).

The pixel circuit may further include a storage capacitor Cst. One end of the storage capacitor Cst is connected to the gate of the driving transistor T1, and the other end of the storage capacitor Cst is connected to the source of the driving transistor T1.

The pixel circuit may further include a light-emitting device, the anode of the light-emitting device is connected to the source of the driving transistor T1, and the cathode of the light-emitting device is connected to the negative power line.

Wherein, the negative power line is configured to transmit the negative power signal VSS.

The pixel circuit may further include a sensing transistor T3. One of the source or drain of the sensing transistor T3 is connected to the source of the driving transistor T1, and the other of the source or drain of the sensing transistor T3 is connected to the sensing line. The gate of the sensing transistor T3 is connected to the readout control line. The readout control line is configured to transmit the scan signal RD.

The pixel circuit may further include a first switch T5. A first end of the first switch T5 is connected to the sensing line, a second end of the first switch T5 is connected to the reference voltage line, and a control end of the first switch T5 is connected to the sensing control line. Wherein, the reference voltage line is configured to transmit the reference signal Vref. The sensing control line is configured to transmit the sensing control signal SEN-PRE.

The pixel circuit may further include a second switch T4. A first end of the second switch T4 is connected to the sensing line, a second end of the second switch T4 is connected to the input end of the analog-to-digital converter ADC, and the control end of the second switch T4 is connected to the sampling control line. The sampling control line is configured to transmit the sampling control signal SAMP.

Wherein, when the first switch T5 and the sensing transistor T3 are in a conductive state at the same time, the reference signal Vref can reset the source potential of the driving transistor T1. When the second switch T4 and the sensing transistor T3 are in the conductive state at the same time, the analog-to-digital converter ADC can output the obtained source potential of the driving transistor T1 to the data driver, and then the data driver can provide the corresponding data signal (data) to data wire.

Wherein, the light-emitting device can be an organic light-emitting diode, a quantum dot light-emitting diode, a mini light-emitting diode or a micro-light emitting diode.

Figure 3:
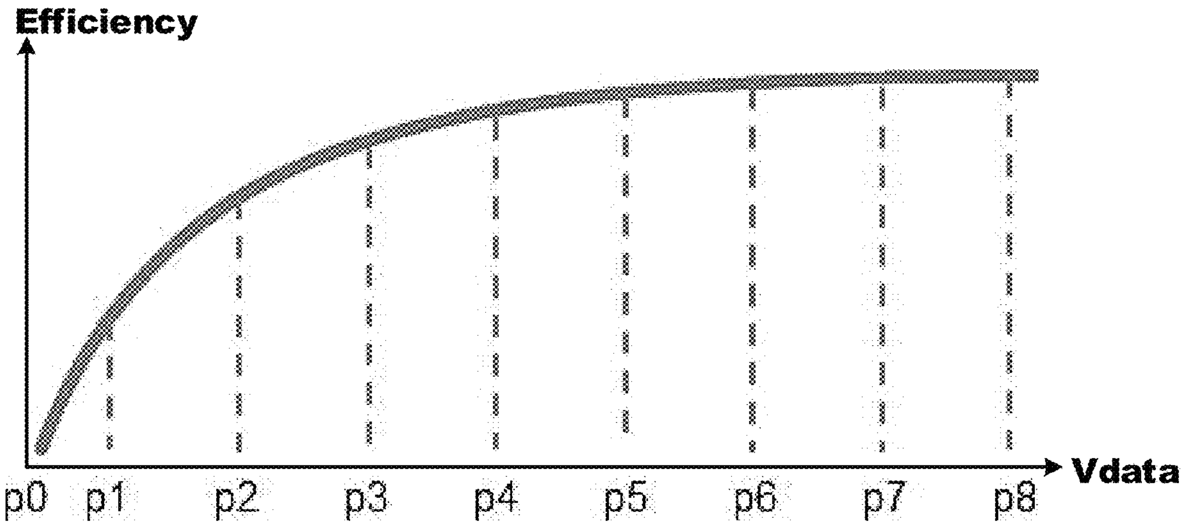
FIG. 3 (Prior art)
FIG. 3 is a schematic diagram of the relationship between the voltage transmission loss ratio and the voltage of the data signal in the related art.

In order to alleviate the brightness shift caused by the voltage transmission loss of the data signal data, the related technology uses the relationship curve between the voltage transmission loss ratio (Efficiency) and the voltage of the data signal data as shown in FIG. 3 to perform the pixel circuit compensate. As can be seen from FIG. 3, the relationship curve is a nonlinear function as described below, which includes more parameters that need to be stored, which results in the need to occupy more storage resources. At the same time, compared with linear functions, the complexity of the nonlinear function is higher, and the error rate during the compensation process is also higher.

Figure 4:
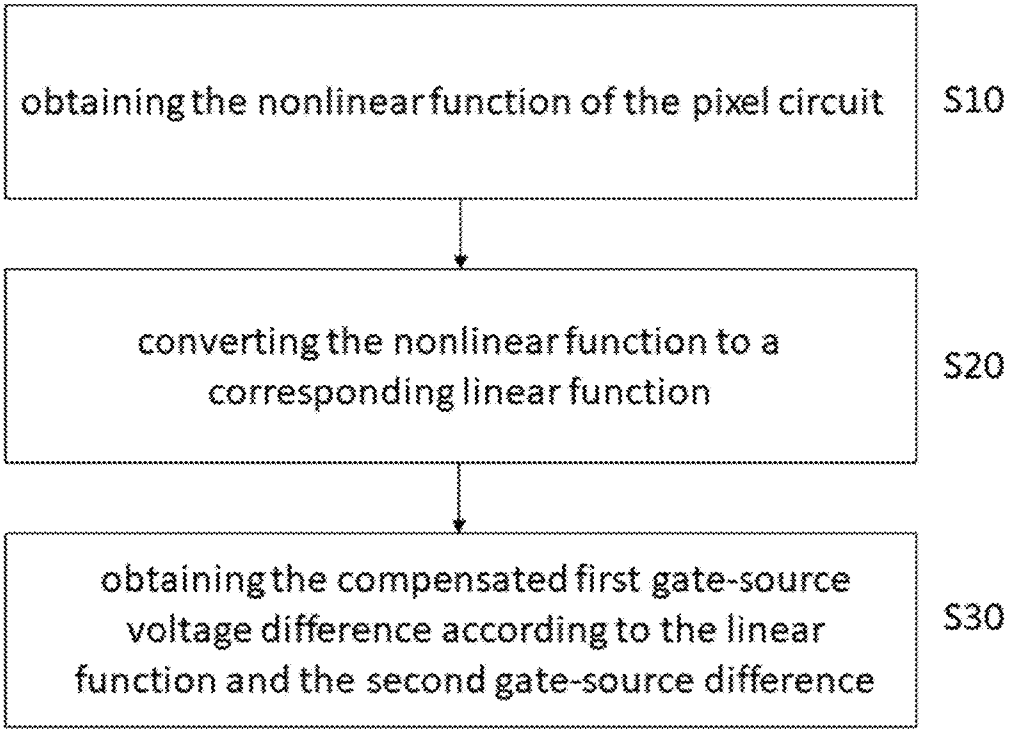
FIG. 4 is a schematic flowchart of a compensation method provided by an embodiment of the present application.

In view of the technical problem mentioned above that storage resources are excessively occupied due to large amounts of compensation data, this embodiment provides a compensation method for a pixel circuit, as shown in FIG. 4. The compensation method includes the following steps:

Step S10: obtaining the nonlinear function of the pixel circuit.

Step S20: converting the nonlinear function into the corresponding linear function.

Step S30: obtaining the compensated first gate-source voltage difference according to the linear function and the second gate-source voltage difference.

It can be understood that the compensation method and display panel provided by this embodiment obtain the nonlinear function of the pixel circuit first, then convert the nonlinear function into the corresponding linear function, and then obtain compensated first gate-source voltage difference according to the linear function and the second gate-source voltage difference. Since the nonlinear function requires more compensation data and has a larger error than the linear function, therefore, using the converted linear function for compensation can reduce the required storage resources and improve accuracy of compensation.

Wherein, the nonlinear function is the relationship curve between the voltage transmission loss ratio and the voltage of the data signal. The voltage transmission loss ratio is a ratio of the second gate-source voltage difference of the driving transistor in the pixel circuit in the light-emitting stage to the first gate-source voltage difference of the driving transistor in the writing stage.

Figure 5:
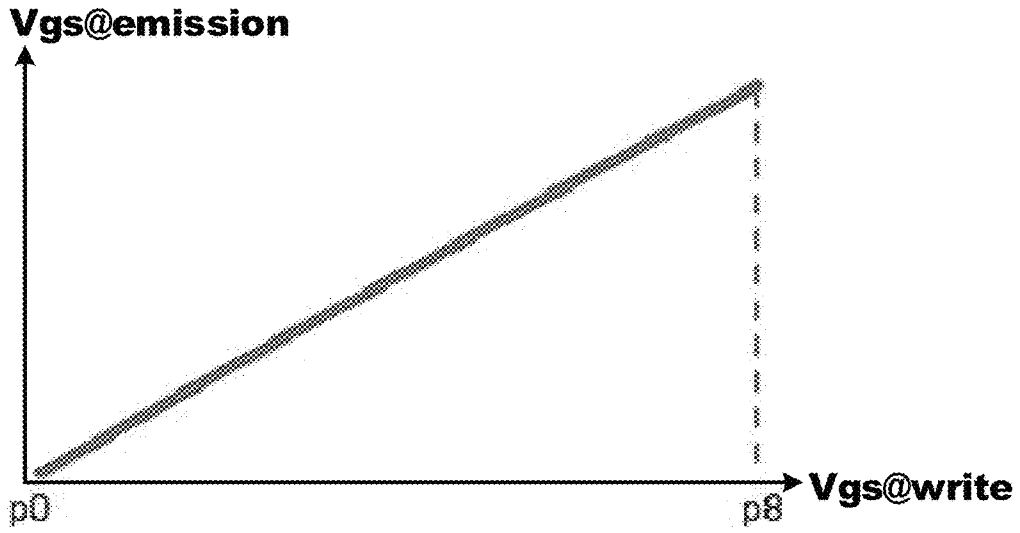
FIG. 5 is a schematic diagram of the conversion of the linear function in the compensation method shown in FIG. 4.
Figure 6:
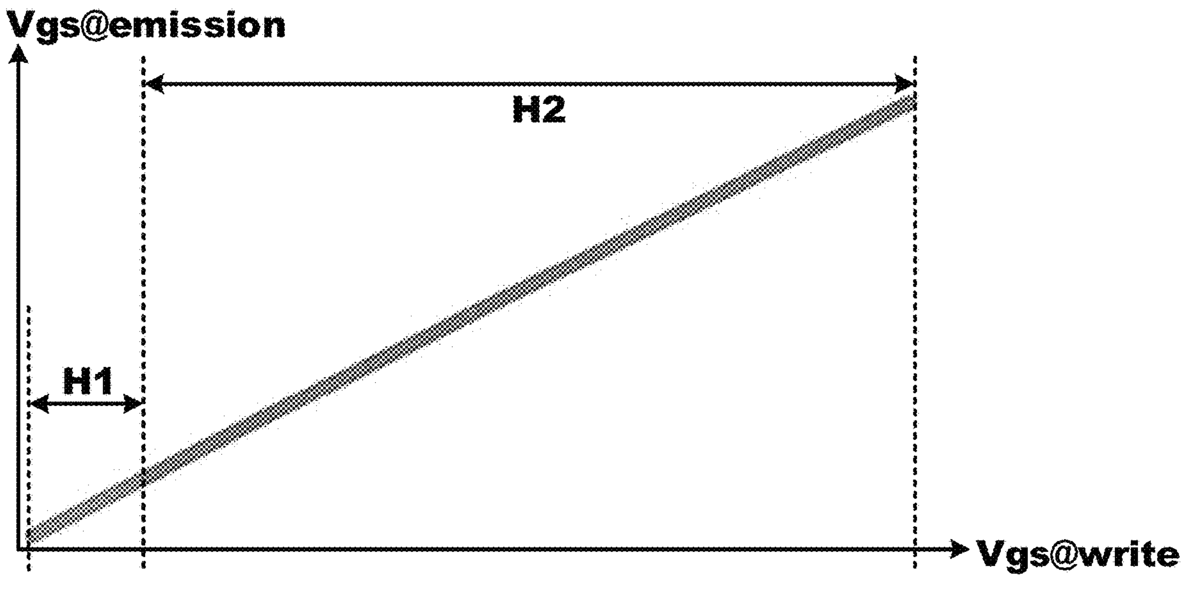
FIG. 6 is a schematic diagram of the conversion of the first linear function and the second linear function in the compensation method shown in FIG. 4.

As shown in FIGS. 5 and 6, the linear function is the relationship curve between the first gate-source voltage difference and the second gate-source voltage difference.

It should be noted that the above-mentioned nonlinear function is shown in FIG. 3 and can be obtained through simulation or experiment. For example, multiple different point values (multiple in P0-P8) in Vdata can be selected to obtain the Vgs@write and Vgs@emission corresponding to each point value. Then, Efficiency is obtained according to the ratio of Vgs@emission and Vgs@write corresponding to the same point value. Then, the relationship curve shown in FIG. 3 can be determined according to multiple sets of Vdata and Efficiency.

In one embodiment, the step of converting the nonlinear function into the corresponding linear function which is a relationship curve between the first gate-source voltage difference and the second gate-source voltage difference comprisings: setting the voltage transmission loss ratio, the first gate-source voltage difference and the second gate-source voltage difference are Efficiency, Vgs@write and Vgs@emission respectively, the nonlinear function is converted into the following intermediate relationship:

$$\text{Efficiency}^{*}\,Vgs@\text{write}=Vgs@\text{emission}.$$

It should be noted that the steps of converting the nonlinear function into the corresponding linear function are specifically as follows: converting the nonlinear function in FIG. 3 into the linear function shown in FIG. 4 or FIG. 5.

Specifically, the voltage (i.e., Vdata) of the data signal (data) is known. That is to say, the gate potential of the driving transistor during the writing phase is Vdata. During the writing phase, the source potential (i.e., Vs) of the driving transistor T1 is the potential (Vref) of reference signal (Vref).

Therefore, it can be obtained that the first gate-source voltage difference (Vgs@write) is Vdata−Vref. The voltage transmission loss ratio (Efficiency) can be determined in advance through relevant technologies or experimental methods. Based on the above intermediate relationship, the second value in the light-emitting stage can be obtained. The gate-source voltage difference is Vgs@emission, and then the above-mentioned intermediate relationship can be obtained based on some point values of Vgs@write and Vgs@emission.

In one embodiment, the step of converting the nonlinear function into the corresponding linear function which is a relationship curve between the first gate-source voltage difference and the second gate-source voltage difference further comprises: converting the intermediate relationship equation into linear function as follows:

$$Vgs@\text{emission}=k^{*}Vgs@\text{write}+b, \text{ where } k \text{ and } b \text{ are constants.}$$

It should be noted that by obtaining some corresponding point values from the curve of the above-mentioned intermediate relationship, a linear function as shown in FIG. 5 or FIG. 6 can be fitted.

In one embodiment, the step of obtaining the compensated first gate-source voltage difference according to the linear function and the second gate-source voltage difference comprises: storing k, b; obtaining the compensated first gate-source voltage difference in the low grayscale ranges according to k1, b1, the redetermined second gate-source voltage difference and the first linear function.

It should be noted that each pixel circuit corresponds to a set of k and b. That is to say, during the compensation process, only a set of k and b for each pixel circuit needs to be stored to achieve the voltage transmission loss of the data signal data. Compared with storing fixed parameters in nonlinear functions, this number is smaller, so corresponding storage resources can be saved.

After the step of obtaining the compensated first gate-source voltage difference, since the source potential (i.e., Vs) of the driving transistor T1 remains unchanged during the writing stage, therefore the voltage of the compensated data signal can be determined according to the compensated first gate-source voltage difference, and then the pixel circuit is charged according to the voltage of the compensated data signal. In this way, the light-emitting device can display the desired brightness during the light-emitting stage, and is also beneficial to reducing the brightness difference between different pixel circuits.

In one embodiment, the step of converting the nonlinear function into the corresponding linear function which is a relationship curve between the first gate-source voltage difference and the second gate-source voltage difference comprises steps of: dividing the data signal into multiple grayscale ranges according to a voltage magnitude of the data signal; converting the nonlinear function into the multiple linear functions in different grayscale ranges.

It should be noted that during the fitting process of the above linear function, since the curve shown in FIG. 3 has different curvatures at different positions, if the curve shown in FIG. 3 is fit as a whole as shown in FIG. 5, a linear function may have a large error within a certain grayscale range. Therefore, in this embodiment, segmented fitting according to the grayscale ranges can further improve the accuracy of compensation.

In one embodiment, as shown in FIG. 6, the step of converting the nonlinear function into a corresponding linear function which is the relationship curve between the first gate-source voltage difference and the second gate-source voltage difference further comprises steps of: constructing plurality of grayscale ranges including a low grayscale range H1 and a high grayscale range H2; converting the nonlinear function into a first linear function in the low grayscale range H1 and a second linear function in the high grayscale range H2.

It should be noted that, for the Vgs@emission−Vgs@write linear equation shown in FIG. 5 obtained by fitting, there may be a large deviation between the fitted value and the actual value in the low grayscale range H1. Therefore, this embodiment performs separate fitting of the linear function in the low grayscale range H1, which can improve the accuracy of compensation.

Wherein, the step of dividing value between low gray level and high gray level can be determined by comparing the deviation trend between the fitting value and the actual value.

In one embodiment, the step of converting the nonlinear function into the first linear function in the low grayscale range H1 and the second linear function in the high grayscale range H2 comprises steps of: determining the first linear function as Vgs@emission=k1*Vgs@write+b1, where k1 and b1 are both constants; determining the second linear function as Vgs@emission=k2*Vgs@write+b2, where k2 and b2 are both constants.

In one embodiment, the step of obtaining the compensated first gate-source voltage difference according to the linear function and the second gate-source voltage difference comprises steps of: obtaining the compensated first gate-source voltage difference in the low grayscale range H1 according to k1, b1, the redetermined second gate-source voltage difference and the first linear function; obtaining the compensated first gate-source voltage difference in the high grayscale range H2 according to k2, b2, the redetermined second gate-source voltage difference and the second linear function.

It should be noted that the specific process of this embodiment can be carried out with reference to the detailed process shown in FIG. 5. The difference is that the nonlinear function shown in FIG. 3 in the low grayscale range H1 is fitted to the first linear function shown in FIG. 6, and the nonlinear function shown in FIG. 3 in the high grayscale range H2 is fitted to the second linear function shown in FIG. 6.

Figure 7:
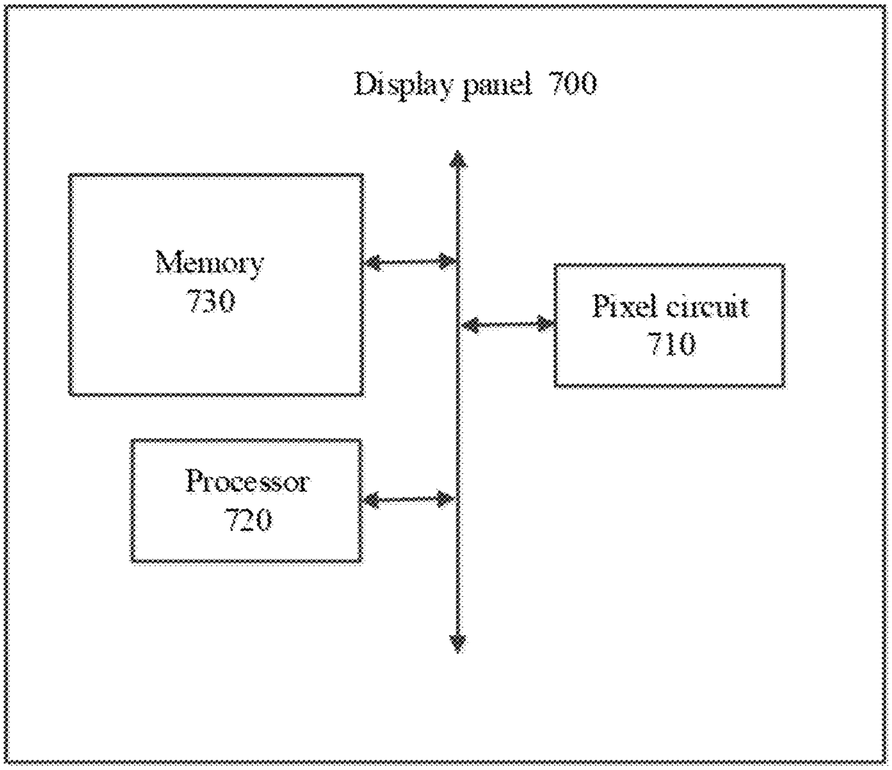
FIG. 7 is a schematic structural diagram of a display panel according to an embodiment of the present application.

In one embodiment, this embodiment provides a display panel that performs the compensation method in at least one of the above embodiments. FIG. 7 is a schematic structural diagram of a display panel according to an embodiment of the present application. The display panel 700 includes a pixel circuit 710, a processor 720, and a memory 730, where the memory 730 is used to store program instructions for performing the compensation method of any of previous embodiments of the present application, the processor 720 is used to call and run the program instructions stored in the memory 730 to perform the compensation method, and the pixel circuit 710 may be a pixel circuit well known in the display field.

It can be understood that, since the display panel provided by this embodiment implements the compensation method in at least one of the above embodiments, it can also be obtained by obtaining the nonlinear function of the pixel circuit firstly, and then converting the nonlinear function into the corresponding linear function, and then obtaining the compensated first gate-source voltage difference according to the linear function and the second gate-source voltage difference. Since nonlinear functions require more compensation data and have larger errors than linear functions, using converted linear functions for compensation can reduce the required storage resources and improve the accuracy of compensation.

In the above embodiments, each embodiment is described with its own emphasis. For parts that are not described in detail in a certain embodiment, please refer to the relevant descriptions of other embodiments.

The compensation method of the pixel circuit and the display panel provided by the embodiments of the present application have been introduced in detail. To sum up, although the present disclosure has been disclosed as above with the preferred embodiment, the above preferred embodiment is not configured to limit the present disclosure, and those skilled in the art can make various changes and embellishments without departing from the spirit and scope of the present disclosure, so the scope of protection of the present disclosure is subject to the scope defined by the claims.

What is claimed is:

1. A compensation method for a pixel circuit, comprising steps of:

obtaining a nonlinear function of the pixel circuit, wherein the nonlinear function is a relationship curve between a voltage transmission loss ratio and a voltage of a data signal, the voltage transmission loss ratio is a ratio of a second gate-source voltage difference of a driving transistor in the pixel circuit in a light-emitting phase to a first gate-source voltage difference of the driving transistor in a writing phase;

converting the nonlinear function into a corresponding linear function which is a relationship curve between the first gate-source voltage difference and the second gate-source voltage difference;

obtaining a compensated first gate-source voltage difference according to the linear function and the second gate-source voltage difference;

wherein the step of converting the nonlinear function into the corresponding linear function which is the relationship curve between the first gate-source voltage difference and the second gate-source voltage difference comprises steps of:

setting the voltage transmission loss ratio, the first gate-source voltage difference and the second gate-source voltage difference as Efficiency, Vgs@write and Vgs@emission, respectively;

converting the nonlinear function into a following intermediate relationship:

$$\text{Efficiency}*Vgs\text{@write}=Vgs\text{@emission}.$$

2. The compensation method according to claim 1, wherein the step of converting the nonlinear function into the corresponding linear function which is the relationship curve between the first gate-source voltage difference and the second gate-source voltage difference further comprises steps of:

converting the intermediate relationship into the linear function as follows:

$$Vgs@\text{emission}=k*Vgs@\text{write}+b$$, where $k$ and $b$ are constants.

3. The compensation method according to claim 2, wherein the step of obtaining the compensated first gate-source voltage difference according to the linear function and the second gate-source voltage difference comprises steps of:

storing k, b;

obtaining the compensated first gate-source voltage difference according to k, b, the redetermined second gate-source voltage difference and the linear function.

4. The compensation method according to claim 1, wherein the step of converting the nonlinear function into the corresponding linear function which is the relationship curve between the first gate-source voltage difference and the second gate-source voltage difference comprises steps of:

dividing the data signal into multiple grayscale ranges according to a voltage magnitude of the data signal;

converting the nonlinear function into the multiple linear functions in different grayscale ranges.

5. The compensation method according to claim 4, wherein the step of converting the nonlinear function into a corresponding linear function which is the relationship curve between the first gate-source voltage difference and the second gate-source voltage difference further comprises steps of:

constructing the multiple grayscale ranges including a low grayscale range and a high grayscale range;

converting the nonlinear function into a first linear function in the low grayscale range and a second linear function in the high grayscale range.

6. The compensation method according to claim 5, wherein the step of converting the nonlinear function into the first linear function in the low grayscale ranges and the second linear function in the high grayscale ranges comprises steps of:

determining the first linear function as Vgs@emission=k1*Vgs@write+b1, where k1 and b1 are both constants;

determining the second linear function as Vgs@emission=k2*Vgs@write+b2, where k2 and b2 are both constants.

7. The compensation method according to claim 6, wherein the step of obtaining the compensated first gate-source voltage difference according to the linear function and the second gate-source voltage difference comprises steps of:

obtaining the compensated first gate-source voltage difference in the low grayscale ranges according to k1, b1, the redetermined second gate-source voltage difference and the first linear function;

obtaining the compensated first gate-source voltage difference in the high grayscale ranges according to k2, b2, the redetermined second gate-source voltage difference and the second linear function.

8. The compensation method according to claim 1, wherein after the step of obtaining the compensated first gate-source voltage difference according to the linear function and the second gate-source voltage difference, the compensation method comprises steps of:

determining the voltage of the compensated data signal according to the compensated first gate-source voltage difference;

charging the pixel circuit according to the voltage of the compensated data signal.

9. A display panel, characterized in that the display panel comprising a processor configured to call and run program instructions stored in a memory to perform a compensation method for a pixel circuit, comprising steps of:

obtaining a nonlinear function of the pixel circuit, wherein the nonlinear function is a relationship curve between a voltage transmission loss ratio and a voltage of a data signal, the voltage transmission loss ratio is a ratio of a second gate-source voltage difference of a driving transistor in the pixel circuit in a light-emitting phase to a first gate-source voltage difference of the driving transistor in a writing phase;

converting the nonlinear function into a corresponding linear function which is a relationship curve between the first gate-source voltage difference and the second gate-source voltage difference;

obtaining a compensated first gate-source voltage difference according to the linear function and the second gate-source voltage difference;

wherein the step of converting the nonlinear function into the corresponding linear function which is the relationship curve between the first gate-source voltage difference and the second gate-source voltage difference comprises steps of:

setting the voltage transmission loss ratio, the first gate-source voltage difference and the second gate-source voltage difference as Efficiency, Vgs@write and Vgs@emission, respectively;

converting the nonlinear function into a following intermediate relationship:

$$\text{Efficiency}*Vgs@\text{write}-Vgs@\text{emission}.$$

10. The display panel according to claim 9, wherein the step of converting the nonlinear function into the corresponding linear function which is the relationship curve between the first gate-source voltage difference and the second gate-source voltage difference further comprises steps of:

converting the intermediate relationship into the linear function as follows:

$$Vgs@\text{emission}=k*Vgs@\text{write}+b$$, where $k$ and $b$ are constants.

11. The display panel according to claim 10, wherein the step of obtaining the compensated first gate-source voltage difference according to the linear function and the second gate-source voltage difference comprises steps of:

storing k, b;

obtaining the compensated first gate-source voltage difference according to k, b, the redetermined second gate-source voltage difference and the linear function.

12. The display panel according to claim 9, wherein the step of converting the nonlinear function into the corresponding linear function which is the relationship curve between the first gate-source voltage difference and the second gate-source voltage difference comprises steps of:

dividing the data signal into multiple grayscale ranges according to a voltage magnitude of the data signal;

converting the nonlinear function into the multiple linear functions in different grayscale ranges.

13. The display panel according to claim 12, wherein the step of converting the nonlinear function into a corresponding linear function which is the relationship curve between the first gate-source voltage difference and the second gate-source voltage difference further comprises steps of:

constructing the multiple grayscale ranges including a low grayscale range and a high grayscale range;

converting the nonlinear function into a first linear function in the low grayscale range and a second linear function in the high grayscale range.

14. The display panel according to claim 13, wherein the step of converting the nonlinear function into the first linear function in the low grayscale ranges and the second linear function in the high grayscale ranges comprises steps of:

determining the first linear function as Vgs@emission=k1*Vgs@write+b1, where k1 and b1 are both constants;

determining the second linear function as Vgs@emission=k2*Vgs@write+b2, where k2 and b2 are both constants.

15. The display panel according to claim 14, wherein the step of obtaining the compensated first gate-source voltage difference according to the linear function and the second gate-source voltage difference comprises steps of:

obtaining the compensated first gate-source voltage difference in the low grayscale ranges according to k1, b1, the redetermined second gate-source voltage difference and the first linear function;

obtaining the compensated first gate-source voltage difference in the high grayscale ranges according to k2, b2, the redetermined second gate-source voltage difference and the second linear function.

16. The display panel according to claim 9, wherein after the step of obtaining the compensated first gate-source voltage difference according to the linear function and the second gate-source voltage difference, the compensation method comprises steps of:

determining the voltage of the compensated data signal according to the compensated first gate-source voltage difference;

charging the pixel circuit according to the voltage of the compensated data signal.

17. A compensation method for a pixel circuit, comprising steps of:

obtaining a nonlinear function of the pixel circuit, wherein the nonlinear function is a relationship curve between a voltage transmission loss ratio and a voltage of a data signal, the voltage transmission loss ratio is a ratio of a second gate-source voltage difference of a driving transistor in the pixel circuit in a light-emitting phase to a first gate-source voltage difference of the driving transistor in a writing phase;

converting the nonlinear function into a corresponding linear function which is a relationship curve between the first gate-source voltage difference and the second gate-source voltage difference;

obtaining a compensated first gate-source voltage difference according to the linear function and the second gate-source voltage difference;

wherein the step of converting the nonlinear function into the corresponding linear function which is the relationship curve between the first gate-source voltage difference and the second gate-source voltage difference comprises steps of: dividing the data signal into multiple grayscale ranges according to a voltage magnitude of the data signal; and converting the nonlinear function into the multiple linear functions in different grayscale ranges;

wherein the step of converting the nonlinear function into a corresponding linear function which is the relationship curve between the first gate-source voltage difference and the second gate-source voltage difference further comprises steps of: constructing the multiple grayscale ranges including a low grayscale range and a high grayscale range; and converting the nonlinear function into a first linear function in the low grayscale range and a second linear function in the high grayscale range; and wherein the step of converting the nonlinear function into the first linear function in the low grayscale ranges and the second linear function in the high grayscale ranges comprises steps of: determining the first linear function as Vgs@emission=k1*Vgs@write+b1, where k1 and b1 are both constants; and determining the second linear function as Vgs@emission=k2*Vgs@write+b2, where k2 and b2 are both constants.

* * * * *